E. N. LIGHTFOOT.
ELECTRIC HEATING DEVICE.
APPLICATION FILED APR. 2, 1919.

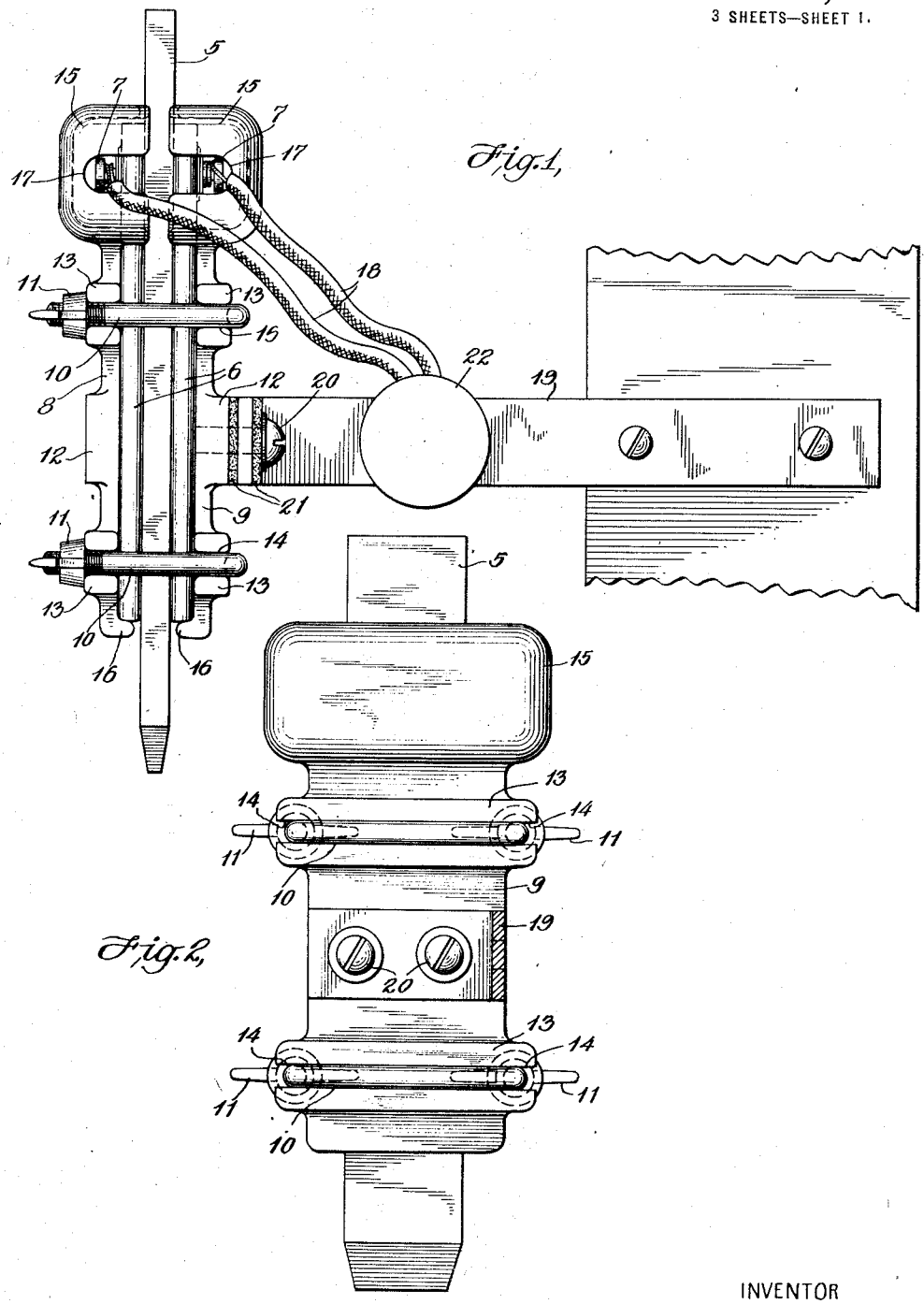

1,370,136.

Patented Mar. 1, 1921.
3 SHEETS—SHEET 2.

INVENTOR
Edwin N. Lightfoot
BY
Edwin B. H. Tower Jr.
ATTORNEY

E. N. LIGHTFOOT.
ELECTRIC HEATING DEVICE.
APPLICATION FILED APR. 2, 1919.
1,370,136.
Patented Mar. 1, 1921.
3 SHEETS—SHEET 3.
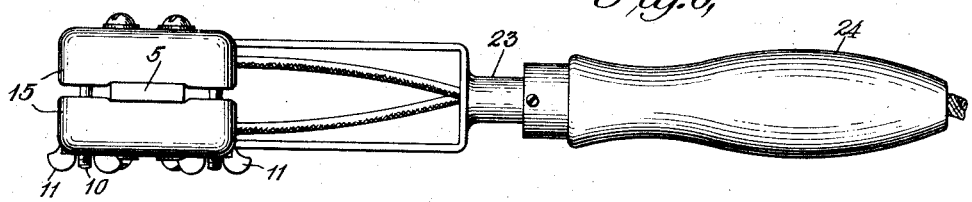
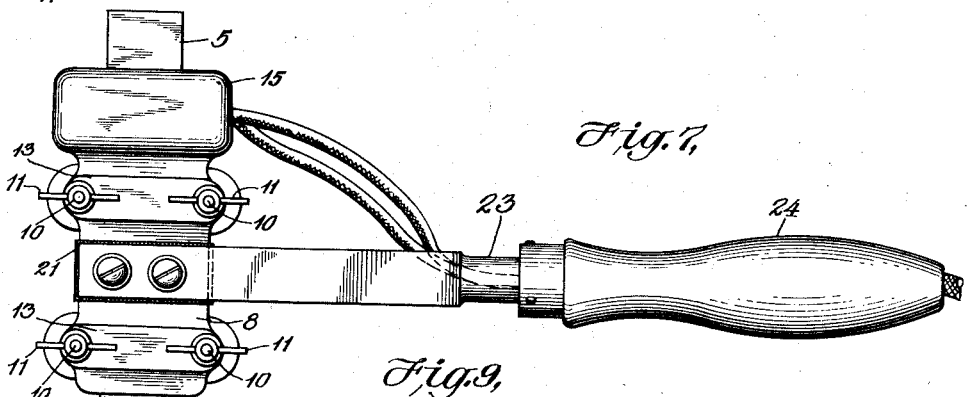
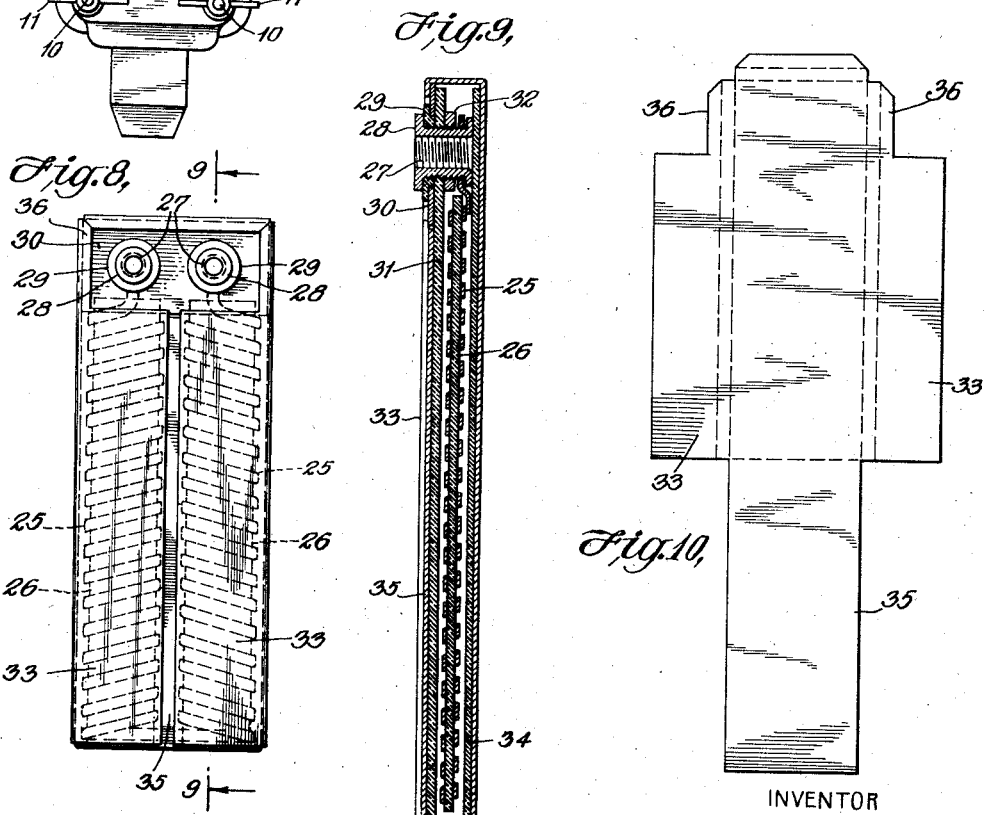
INVENTOR
Edwin N. Lightfoot
BY
ATTORNEY

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRIC HEATING DEVICE.

1,370,136.    Specification of Letters Patent.    Patented Mar. 1, 1921.

Application filed April 2, 1919. Serial No. 286,902.

*To all whom it may concern:*

Be it known that I, EDWIN N. LIGHTFOOT, a citizen of the United States, residing at New York, in the county of Bronx and State of New York, have invented new and useful Improvements in Electric Heating Devices, of which the following is a specification.

This invention relates to electric heating devices.

More particularly the invention relates to an electric heating device adapted for soldering, branding, sealing wax melting and similar operations.

An object of the present invention is to provide an efficient and heavy-duty heating device of this class.

Another object is to provide a structure which can be easily assembled and taken apart.

Other objects and advantages will appear from the specification and claims.

The invention as preferably embodied comprehends an element for conducting the heat to the work, with electric heater units firmly pressed against the sides thereof by removable clamping or pressure plates.

In the accompanying drawings:

Figure 1 is a side elevation of the invention embodied in a soldering fixture or permanently mounted soldering iron.

Fig. 2 is an end elevation thereof.

Figs. 6 and 7 are, respectively, plan and side elevation of the invention embodied in a hand soldering tool.

Fig. 8 is a top plan view of one of the heating elements.

Fig. 9 is an enlarged cross-section thereof upon the line 9—9 of Fig. 8, and

Fig. 10 shows the form of the blank which forms the armored casing for the heating elements.

Figure 3:
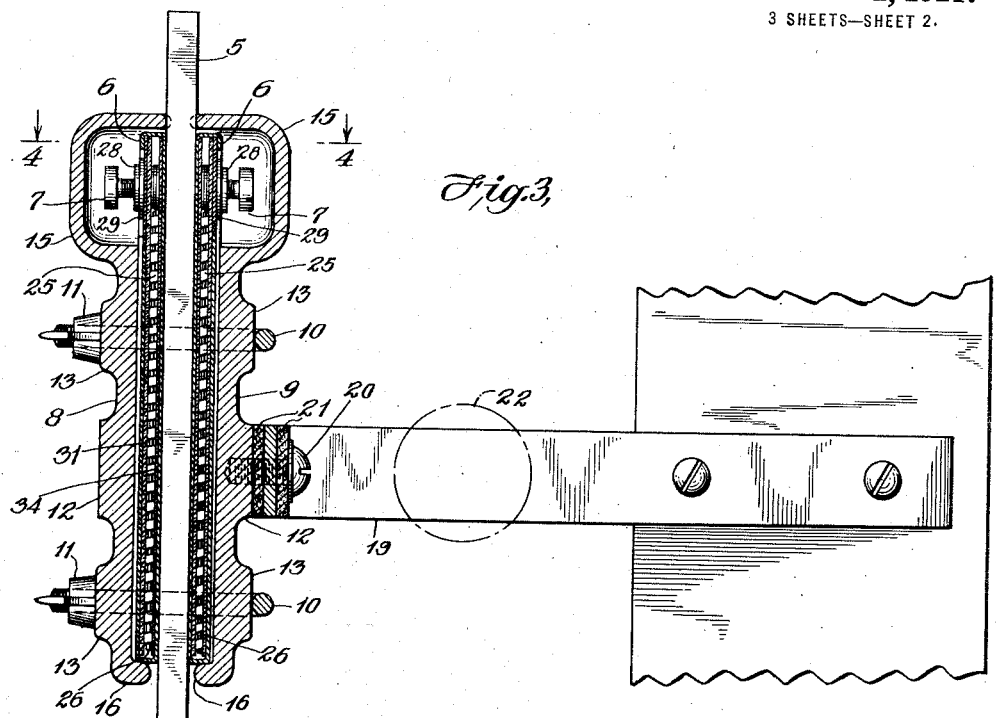
Fig. 3 is a longitudinal cross-section.
Figure 4:
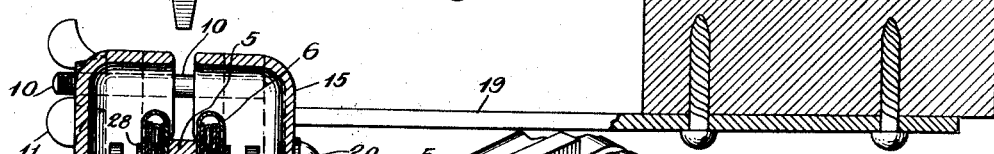
Fig. 4 is a horizontal cross-section on the line 4—4 of Fig. 3.
Figure 5:
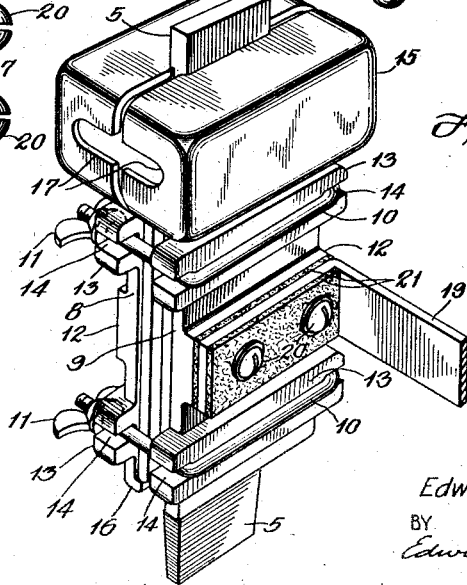
Fig. 5 is a perspective of a complete soldering fixture.

Referring to Figs. 1 to 5, inclusive, the heat-conducting or soldering stud 5 comprises a rectangular bar of copper or other suitable material, the lower end of which is beveled to facilitate its application to the work. Placed upon the opposite wider sides thereof and in close contact therewith are a pair of metal-sheathed electric heating elements 6, each of which is provided with a pair of suitable terminals 7. The heating elements are firmly pressed against the opposite sides of the heat-conducting stud by cast-iron clamping or pressure plates 8 and 9 which are removably held in position by a pair of U-shaped clamping screws 10 and wing nuts 11. The stud 5 may be readily extended, as it is burned or worn off, and may be replaced by a similar or other operating tool upon the loosening of the wing nuts.

Clamping plates 8 and 9 are preferably made alike and each has a transverse rib 12 which adds strength to the plate and a pair of bosses 13 which also add strength and provide suitable seats for the clamping screws and nuts. The ribs 13 extend on each side beyond the body of the clamping plate and are provided with slots 14 through which the ends of the clamping screws 10 project. The upper ends of the clamping plates are expanded to provide hollow terminal boxes 15 while the lower ends are provided with inturned flanges 16 which serve to position the heating elements and protect them from blows and wear and the fumes from soldering acids. The opposite sides of each terminal box are provided with openings 17 through which the conducting wires 18 pass to the terminals 7.

To permanently attach the fixture to a bench or other suitable support an L-shaped bracket 19 is secured to the boss 12 of clamping plate 9 by a pair of screws 20. Strips of heat-insulating material 21, such as asbestos, confine the heat to the body of the device.

The bracket 19 may also support a suitable terminal 22 which may be a plug terminal or a snap switch as desired.

Figs. 6 and 7 show a soldering iron of the same general construction as that just described. Each clamping plate, however, has secured thereto one prong of a bifurcated support 23 to the other end of which is secured a suitable handle 24. The handle may be made hollow to provide for the passage of the conducting wires.

Figs. 8, 9 and 10 show the construction of the armored heating elements. Each element comprises two resistors which are held firmly together and protected by a sheet metal casing. The resistors and terminals may be constructed and assembled in the following manner:

Each resistor comprises a resistance wire or ribbon 25 wound in a spiral upon an insulating strip 26 of mica or other suitable material. The terminal is formed with an internally threaded metal rivet 27 into which a terminal screw may be inserted. The outer end of rivet 27 has a flat head 28 while the inner end is adapted to be flanged over after the terminal is completely assembled. A mica washer 29 is threaded upon the shank of rivet 27 against head 28. The two rivets of a heating element, with their mica washers, are then inserted through the openings in a rectangular metal plate 30. Next a mica strip 31, wide and long enough to cover both resistors and having a pair of openings for the rivets, is placed in position. A metal washer 32 is threaded upon the shank of each rivet and positioned next to the mica strip 31. The end of the resistance ribbon of each resistor is then wound around its respective rivet and the ends of the rivets are flanged over, as shown, and pressed down to compress the terminal structure into a rigid body.

The armored casing is made from a sheet metal blank such as shown in Fig. 10. The two tongues 33 are bent, along the dotted lines, at right angles to the plane of the blank to form a channel of a width sufficient to accommodate two resistors placed side by side. A strip of mica 34 is placed in the bottom of this channel, and, upon this mica, the two resistors and terminals assembled, as previously described, are positioned. The tongue 35 of the casing blank is then bent over upon the top mica 31. Next the side tongues 33 are pressed down upon tongue 35 and the entire structure is put under pressure to compress the element. The terminal structure of the element is firmly held in place by the tongues 36 which are bent over and tightly compressed against it. This construction makes a strong, compact and very efficient heating element. The lower end of the element may be tightly sealed against moisture and acid fumes by filling with solder the two slits left in the lower corners when the tongues are turned over.

A heating device embodying the features of this invention is rugged in construction and is easily assembled. The heating elements are well protected and are applied to the heat conducting member in such a way that the heat is directly applied and radiation losses are reduced. If it becomes necessary to replace the heating elements, this can be readily and quickly accomplished with little expense or labor since it is only necessary to loosen or remove the clamping screws and nuts and the change can be made.

The soldering stud or other tools may be readily replaced or changed for different classes of work. Various conditions of heat may be readily obtained by connecting the various resistance units in different relations as series, parallel and series parallel groupings. This allows one heating device to be used for many classes of service.

What is claimed is:

1. A heating iron comprising a heating stud, an armored electric heating element on opposite sides thereof having terminals mounted thereon whereby said elements may be connected in different relations, a pair of clamping plates retaining the heating elements in position but permitting independent movement of the heating stud, and clamping means coöperating with the plates for adjustably gripping said stud.

2. A soldering iron comprising a heating stud, an electric heating element on opposite sides thereof, a pair of clamping plates, and clamping means passing about said plates whereby said stud may be adjusted independent of the heating element.

3. A soldering iron comprising a heating stud, an armored electric heating element on opposite sides thereof, each armored element having terminals at one end thereof and a joint sealed at the other end against moisture and the like, a pair of clamping plates for adjustably clamping said stud between said heating elements, and locking means coöperating with the plates whereby the heating stud may be adjusted independent of the plates by loosening the locking means.

4. A soldering iron having a soldering stud, an armored electric heating element on opposite sides thereof, and a pair of clamping plates for adjustably clamping said stud between said elements in good heat-conducting relation therewith.

5. A soldering iron comprising a pair of clamping plates, a pair of corresponding metal-sheathed electric heating elements, a soldering stud located between said heating elements, and means coöperating with the clamping plates for tightly but adjustably gripping said stud between the heating elements.

6. In a soldering iron having a pair of clamping plates, a soldering stud adjustable therebetween, and clamping means for said plate, a detachable armored metal sheathed heating element having terminals at one end and a covering sealed at the other end to protect the resistor against moisture and acid fumes.

7. A heating device comprising in combination a heating stud, a heating element therefor, and clamping means adjustably holding the heating element to the side of the stud in good heat conducting relation.

8. In a heating device the combination of a heating stud, a heating element therefor, and clamping means coöperating with said heating element to permit independent adjustment of the heating stud.

9. A soldering iron comprising a heating stud, an armored heating element sealed at one end, a pair of clamping members for the stud and heating element, and clamping means embracing the clamping members to permit relative longitudinal movement between the stud and heating element.

10. A heating iron comprising a pair of heating elements, a heating stud therebetween, and clamping means coöperating with said elements to permit adjustment of the stud and to prevent relative movement between said heating elements.

11. In a heating iron having a heating stud and an armored heating element adjacent said stud, clamping means coöperating with said heating element and said stud, said clamping means including a member for positioning said heating element, and locking means coacting with said plate to permit relative movement between said stud and heating element.

In witness whereof, I have hereunto subscribed my name.

EDWIN N. LIGHTFOOT.